(12) United States Patent
Nagai et al.

(10) Patent No.: US 7,193,973 B2
(45) Date of Patent: Mar. 20, 2007

(54) DATA TRANSMISSION APPARATUS AND METHOD

(75) Inventors: Takeshi Nagai, Tokorozawa (JP); Yoshihiro Kikuchi, Yokohama (JP); Tadaaki Masuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/175,442

(22) Filed: Jul. 7, 2005

(65) Prior Publication Data

US 2006/0015783 A1 Jan. 19, 2006

Related U.S. Application Data

(63) Continuation of application No. 09/984,497, filed on Oct. 30, 2001, now Pat. No. 6,993,689.

(30) Foreign Application Priority Data

Oct. 31, 2000 (JP) .............................. 2000-333916
Jun. 29, 2001 (JP) .............................. 2001-200156

(51) Int. Cl.
*G01R 31/08* (2006.01)
(52) U.S. Cl. .................. 370/252; 370/352; 714/717
(58) Field of Classification Search ................ 370/468, 370/352; 375/240.01
See application file for complete search history.

(56) References Cited

U.S. PATENT DOCUMENTS

| 5,070,536 | A | 12/1991 | Mahany et al. |
| 5,333,137 | A | 7/1994 | Fujiyama |
| 6,085,252 | A | 7/2000 | Zhu et al. |
| 6,154,489 | A | 11/2000 | Kleider et al. |
| 6,189,123 | B1 | 2/2001 | Nystrom et al. |
| 6,339,450 | B1 | 1/2002 | Chang et al. |
| 6,353,251 | B1* | 3/2002 | Kimura ...................... 257/473 |
| 6,442,143 | B1 | 8/2002 | Corry |
| 6,507,672 | B1* | 1/2003 | Watkins et al. ............. 382/232 |
| 6,539,205 | B1 | 3/2003 | Wan et al. |
| 6,570,926 | B1* | 5/2003 | Agrawal et al. ....... 375/240.27 |
| 6,618,363 | B1 | 9/2003 | Bahl |

(Continued)

FOREIGN PATENT DOCUMENTS

| EP | 1 011 245 | 6/2000 |
| JP | 10-243054 | 9/1998 |

(Continued)

OTHER PUBLICATIONS

S.-G. Na, et al., Proceedings of IEEE Icon International Conference on Networks, XP-010514086, pp. 99-104, "TCP-Like Flow Control Algorithm for Real-Time Applications", Sep. 5, 2000.

(Continued)

*Primary Examiner*—Brian Nguyen
(74) *Attorney, Agent, or Firm*—Oblon, Spivak, McClelland, Maier & Neustadt, P.C.

(57) ABSTRACT

A data transmission apparatus comprises an estimation device to estimate a transmission condition of the transmission channel in the transmitter based on at least Jitter information or a packet loss rate obtained from the receiver, and a controller to change at least one of a bit rate of transmission data and a error resilience level according to the estimated transmission condition.

9 Claims, 9 Drawing Sheets

U.S. PATENT DOCUMENTS

| | | |
|---|---|---|
| 6,643,817 B2 | 11/2003 | Baggen |
| 6,707,852 B1 * | 3/2004 | Wang .................... 375/240.12 |
| 6,735,423 B1 | 5/2004 | Uskali et al. |
| 6,961,378 B1 * | 11/2005 | Greenfield et al. .... 375/240.16 |
| 6,987,730 B2 * | 1/2006 | Hata et al. .................. 370/232 |

FOREIGN PATENT DOCUMENTS

| | | |
|---|---|---|
| JP | 11-27645 | 1/1999 |
| JP | 11-225168 | 8/1999 |
| JP | 11-261534 | 9/1999 |
| JP | 2000-151639 | 5/2000 |
| JP | 2000-295597 | 10/2000 |

OTHER PUBLICATIONS

S. Torres-Guijarro, et al., Vehicular Technology Conference, XP-010288201, pp. 2449-2453, "Extending Dect Range Through Speech Coding Control", May 18, 1996.

W. Verbiest, et al., IEEE Journal on Selected Areas in Communications, vol. 7, No. 5, XP-000036743, pp. 761-770, "A Variable Bit Rate Video Codec for Asynchronous Transfer Mode Networks", Jun. 1, 1989.

* cited by examiner

DATA TRANSMISSION APPARATUS AND METHOD

CROSS-REFERENCE TO RELATED APPLICATIONS

This application is a continuation of and claims the benefit of priority under 35 USC §120 from U.S. application Ser. No. 09/984,497, filed Oct. 30, 2001, now U.S. Pat. No. 6,993,689 and is based upon and claims the benefit of priority under 35 USC §119 from Japanese Patent Applications No. 2000-333916, filed Oct. 31, 2000; and No. 2001-200156, filed Jun. 29, 2001, the entire contents of both which are incorporated herein by reference.

BACKGROUND OF THE INVENTION

1. Field of the Invention

The present invention relates to a data transmission method for transmitting encoded moving/still picture by using a wired communication network such as ISDN (Integrated Services Digital Network) or a wireless communication network such as PHS (Personal handy-phone System) or satellite communication and a data transmission apparatus to which such method is applied.

2. Description of Related Art

In recent years, with progress of digital encoding technology of a variety of information such as image and a broadband network technology, the development of applications using these technologies becomes active, and a system of transmitting compression-encoded image by utilizing a communication network is developed.

For example, an input video signal is encoded at a video encoder, the obtained encoded data is provided to an encoded data transmitter, and transmission data is transmitted to a transmission channel. In this way, a video is encoded and transmitted. In recent years, with the spread of Internet/Intranet, there has been increased an application or system of transmitting/receiving a packet of data. Providing data as a packet is very effective means for efficiently sharing a bandwidth of a communication channel by a plurality of users.

In the meantime, as a protocol for transmitting/receiving packet data via Internet/Intranet, there exists TCP/IP (Transmission Control Protocol/Internet Protocol) or UDP/IP (User Datagram Protocol/Internet Protocol) and the like.

Among them, TCP/IP is an Internet standard protocol. This protocol is applied as the world's best known protocol to Intranet or LAN as well as Internet. TCP works in a transport layer that is a fourth layer of an OSI basic reference model, and IP works in a network layer that is a third layer.

In addition, UDP/IP is one of the TCP/IP suite transport layer protocols. TCP is a connection type protocol. UDP is a disconnection type protocol. As with TCP, a host application is identified by using a port number. This protocol is often used to carry short data for monitor control of a network or real time oriented data such as audio data or video data.

TCP/IP incorporates a frame such as retransmission. Thus, this protocol is strong against errors or the like. Even if a large amount of time is required, this protocol is effective to download type applications if an attempt is made to validly receive data. However, this protocol is not powerful for applications requiring real time properties.

In contrast, although UDP/IP does not have a retransmission frame, a delay associated with retransmission does not occur. Thus, this protocol is very effective to applications requiring real time processing.

Transmission of moving picture is exemplified as a typical example of application requiring real time processing. However, in the case of general video communication, video data has a very large amount of data, and overflows a network bandwidth in most cases. In this case, a technique for encoding a video data signal, and transmitting a reduced amount of data is used. Techniques such as motion compensation, discrete cosine transform (DCT), sub-band encoding, pyramid encoding, and variable-length encoding or a combination of these techniques are developed as compression-encoding of a video signal.

As an international standard system for moving picture encoding, there are ISO MPEG-1, MPEG-2, ITU-T H.261, H.262, and H.263. In addition, as an international standard system for multiplying an encoded data stream having a speech/audio signal compressed or other data, there are an ISO MPEG system, ITU-T H.221, and H.223.

Internet or the like is encompassed via an infinite number of networks. Usually, no one knows which network is used or what state is. In addition, an amount of data flowing a network changes from time to time. Thus, a system of judging what amount of data can be communicated in a real time is required.

Therefore, with further advancement from real time applications utilizing UDP/IP, there have been increased in number applications using a packet format called RTP (Real-time Transport Protocol) for adding and transmitting time information or the like to a packet.

This RTP is a protocol for transferring audio data signal or video data signal ruled in RFC 1889 in real time. Usually, data is carried on UDP (User Datagram Protocol). This protocol is assumed to be applied to a multimedia system such as video conference, and data can be exchanged in a real time interactive scheme. However, the protocol has no sound quality or picture quality assurance function. Sequential number or time stamp data is assigned into an RTP header, thereby supporting a read time operation.

RFC is an abbreviation of Request for Comments, and denotes a document such as technical proposal or comments disclosed by TETF (Internet Engineering Task Force). Many de-fact standards such as a variety of protocols of TCP/IP suite are described in RFC.

By utilizing this RTP, time information and a packet number are added to a packet, so that a receiver can display a voice or image by using correct time information, can determine a packet or the like whose order is replaced in a network, and can detect that a packet is lost by referring to a packet number.

Moreover, the RTP provides with a system (RTCP) for notifying network state information such as jitter or packet loss rate from a transmitter to a receiver.

However, how this RTCP information is utilized depends on applications, and is not determined in standards.

In addition, in the case of an image, a bandwidth corresponding to video transmission cannot be allocated in a network bandwidth, thus making it necessary to compress and deliver a video signal in an encoding system such as MPEG, as described previously. Although this encoding system is effective in a decreased amount of data, the system becomes very fragile to a packet loss or error entry by supplying data to unstable Internet. This is because a moving picture encoding system transmits only a difference between a current frame and a previous frame. Thus, partial data missing causes a very serious problem. In the case of using the UDP or RTP, data retransmission is not basically carried out, thus making it necessary to counteract this problem.

There generally exist two modes in picture encoding, that is, one is an inter-frame encoding mode for transmitting a difference between the current frame and the previous frame and an intra-frame encoding mode for carrying out encoding in one frame. In general, intra-frame encoded pictures are provided at a proper timing, and inter-frame encoded pictures are provided between them. An interval between the frames encoded in an intra-frame encoding mode is called a GOP (Group of Picture) interval.

When an encoded picture is missing during transmission to the decoder, the decoded picture corresponding to the missing encoded picture is destroyed. Thereafter, the intra-encoded pictures following the missing encoded picture are decoded based on the destroyed picture. Thus, all the subsequent decoding pictures are affected by the destroyed picture, and decoding cannot be carried out correctly. Therefore, an intra-frame encoded picture is inserted in the way of a stream of frames to cut off a propagation of missing error and recover adequate decoding.

In a conventional technology, it can determine that errors occur in a network. However, how to utilize the determination result has been unknown. Also, a system for notifying the network information to the transmitter in an unique format is conceived. However, the system is based on the specification of associated applications and lacks a general-purpose use. The system receives transmission data using an information receiver, and controls a video encoder within a range of the information received from the network via a transmission channel.

A conventional network condition determination is conceived on assumption of network congestion. However, since Internet is popularized in mobile environment, it is required to consider an error or the like in wireless environment. Current technique does not assume countermeasures against such error.

Further, in the case of dealing with the error, a case in which a network condition changes, and an error rate is not constant is not considered. If a short GOP interval is set in order to counteract a case in which errors frequently occur, the intra-frame encoding increases resulting in impairing the encoding efficiency. When errors occur frequently qualitatively, it may be required to establish such state in which such errors occur frequently. However, in the case of a network in which an error hardly occurs in a normal state, and an error occurs only at one moment, this setting is very wasteful. Conversely, when a long GOP interval is set, it is troublesome that a great influence occurs when an error occurs.

Thus, a real time transmission using RTP is noted. As described above, by utilizing the RTP that is a protocol for transferring audio data signal or video data signal in real time, time information and a packet number are added to a packet, whereby the receiver can display a voice or image by using correct time information, can determine a packet or the like whose order is replaced in a network, or can detect that a packet is lost by referring to a packet number.

Moreover, at the RTP, there is provided a system (RTCP) for notifying network state information such as jitter or packet loss rate from the transmitter or receiver.

BRIEF SUMMARY OF THE INVENTION

It is an object of the present invention to provide a data transmission apparatus and method capable of adjusting a transmission rate by using the RTP characteristics in accordance with a transmission state of a transmission channel based on notification of network state information such as jitter or packet loss rate, obtained from the receiver in the transmitter or capable of carrying out controls such as changing error resilience, thereby making it possible to efficiently transmit data to the maximum, and fully utilize transmission that requires real time properties.

According to an aspect of the invention, there is provided a data transmission apparatus that transmits transmission data from a transmitter to a receiver via a transmission channel, comprising: an estimation device configured to estimate a transmission condition of the transmission channel in the transmitter based on at least Jitter information or a packet loss rate obtained from the receiver; and a controller configured to change at least one of a bit rate of transmission data and a error resilience level according to the estimated transmission condition.

According to another aspect of the invention, there is provided a data transmission method comprising: estimating a transmission condition of the transmission channel in the transmitter based on at least Jitter information or a packet loss rate obtained from the receiver; and changing at least one of a bit rate of transmission data and an error resilience level according to the estimated transmission condition.

According to another aspect of the invention, there is provided a data transmission program stored on a computer readable medium, comprising: instruction means for instructing a computer to estimate a transmission condition of the transmission channel in the transmitter based on at least Jitter information or a packet loss rate obtained from the receiver; and instruction means for instructing the computer to change at least one of a bit rate of transmission data and a error resilience level according to the estimated transmission condition.

DETAILED DESCRIPTION OF THE INVENTION

Hereinafter, embodiments of the present invention will be described with reference to the accompanying drawings.

The present invention utilizes RTP or RTCP that is a protocol for transferring audio data signal or video data signal in real time. The transmitter performs controls such as adjusting a transmission rate or changing error resilience in accordance with a transmission state of a transmission channel based on notification of network state information acquired from the receiver such as jitter (Jitter information) or packet loss rate. In this manner, data transmission can be carried out efficiently to the maximum. Hereinafter, embodiments of the present invention will be described in detail.

First Embodiment

Figure 1:
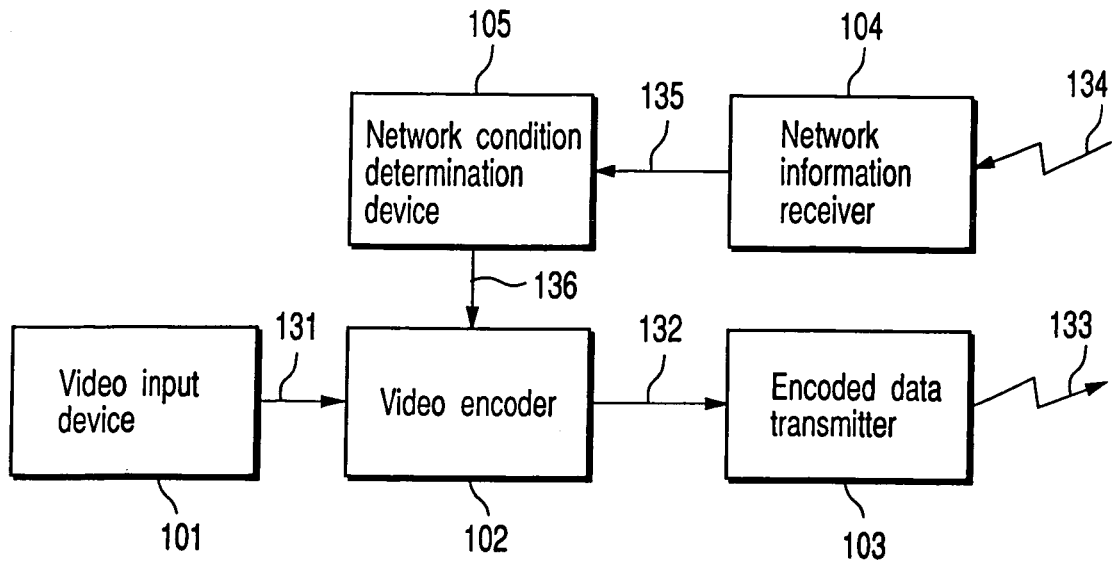
FIG. 1 is a view showing a basic configuration of a data transmission apparatus according to a first embodiment of the present invention.

FIG. 1 shows a basic configuration of an image transmission apparatus according to a first embodiment of the present invention. In FIG. 1, a video signal 131 input from an image input device 101 is processed to be encoded. That is, an encoded data transmitter 103 processes encoded data 132 that has been encoded by a video decoder 102 in the form which conforms to a network, and transmits the encoded data to a receiver. A network information receiver 104 receives network information 134 delivered from the receiver, and outputs the received information to a network condition determination device 105. This network condition determination device 105 has a function that determines a network condition from network information 135 output from the network information receiver 104, and notifies the result as network condition information 136 to the video encoder 102.

The video encoder 102 encodes the video signal 131 using the network condition information 136. This encoding is carried out as follows. That is, in the case of RTP or RTCP, a packet loss rate or Jitter information is provided to the network condition determination device 105. The network condition determination device 105 determines that, if a packet loss rate is not "0" or if a delay time is longer than a predetermined value, any load is applied to a network, and a presumed amount of data cannot be supplied. Then, the network condition determination device 105 is configured so as to carry out processing so as to issue an instruction (network condition information 136) for lowering a bit rate to the video encoder 102, and to lowly set a target bit rate in encoding.

According to the thus configured apparatus, when the video signal 131 is inputted from the image input device 101, the inputted video signal 131 is encoded by the video encoder 102. Encoded data 132 encoded by the video encoder 102 is inputted to the encoded data transmitter 103.

The encoded data transmitter 103 processes the encoded data in the form suitable to a network, and receives the processed data to a receiver. The network information receiver 104 receives the network information 134 delivered from the receiver, and outputs the received information to the network condition determination device 105.

The network condition determination device 105 determines a network condition from the network information 135 outputted from a network information receiver, and notifies the result as the network condition information 136 to the video encoder 102.

The video encoder 102 encodes the video signal 131 using the thus notified network condition information 136.

Figure 10:
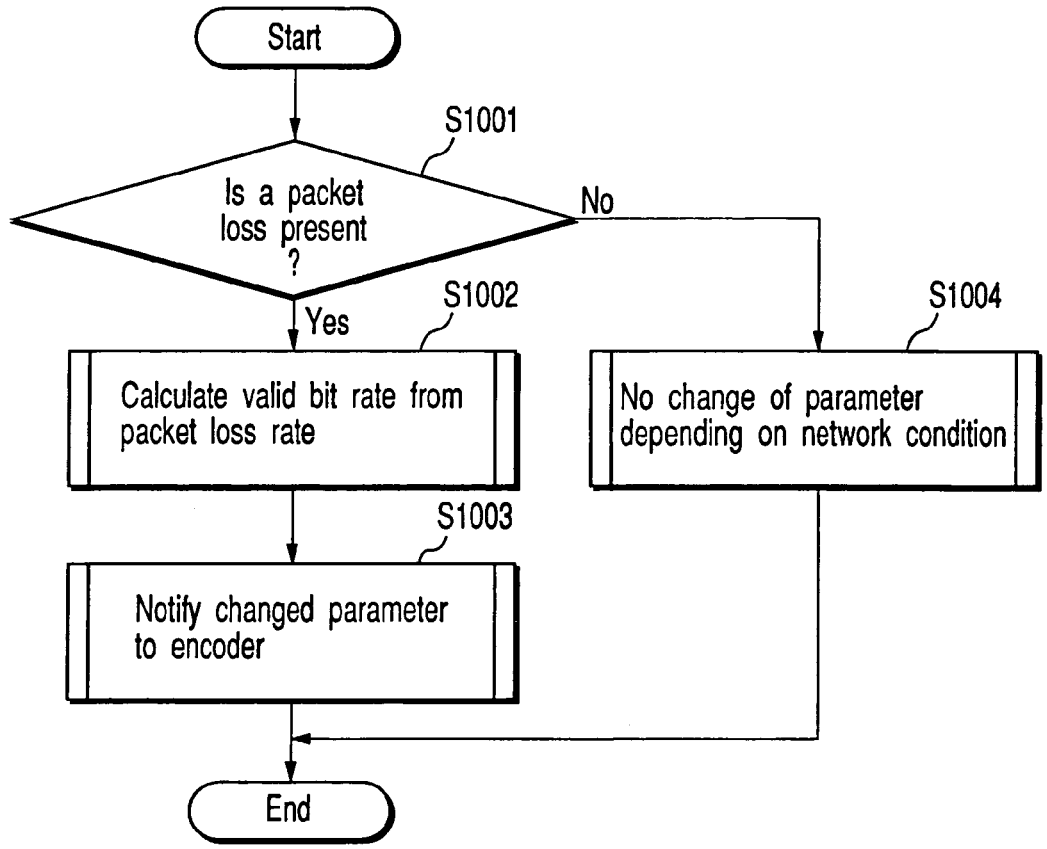
FIG. 10 is a flow chart showing a basic example of the network condition determination method at the network condition determination device in the first embodiment of the present invention.

FIG. 10 shows a very simple example of a method for determining a network condition at the network condition determination device 105 by way of showing a flow chart.

According to this flow chart, at the step S1001, a packet loss rate of network information is checked to see if the rate is "0" or not. As the result of this check, if the packet loss is not "0", an effective bit rate is calculated from the packet loss rate in accordance with the step S1002. This bit rate can be calculated by formula (1) shown below.

$$b' = b \times (1-r) \quad (1)$$

where "b" denotes a current bit rate, b' denotes a new bit rate, and "r" denotes a packet loss rate.

Next, at the step S1003, a parameter (encoding parameter) obtained at the step S1002 is notified to the video encoder 102. Here, the above parameter is used to determine a rate control or error resilience level for encode processing at the image encoder 102. This parameter is also used for adjustments such as adjusting and controlling the encode processing speed of the input image signal 131 to this parameter, thereby changing a bit rate, a frame interval, or an error resilience level.

On the other hand, at the step S1001, when the packet loss rate is "0", no parameter change occurs at the step S1004. This determination method is provided as a mere example. It is possible to employ any other method for obtaining a bit rate based on a case in which the criterion of the step S1001 is determined by thresholds without being set to "0" or others or based on a formula other than the above formula (1).

Therefore, according to the first embodiment, even when a transmission network bandwidth is unknown or when the bandwidth changes halfway, it is possible to reset a parameter or the like based on the receiver's network information, and then, encode and transmit an image in accordance with the parameter suitable to a current network. In this manner, even in the case of a network congestion, although a bit rate is automatically lowered, and an image quality is lowered, it is possible to communicate an image without an occurrence of a phenomenon that an image is destroyed due to such packet loss. This method is very effective in image transmission in real time.

Figure 11:
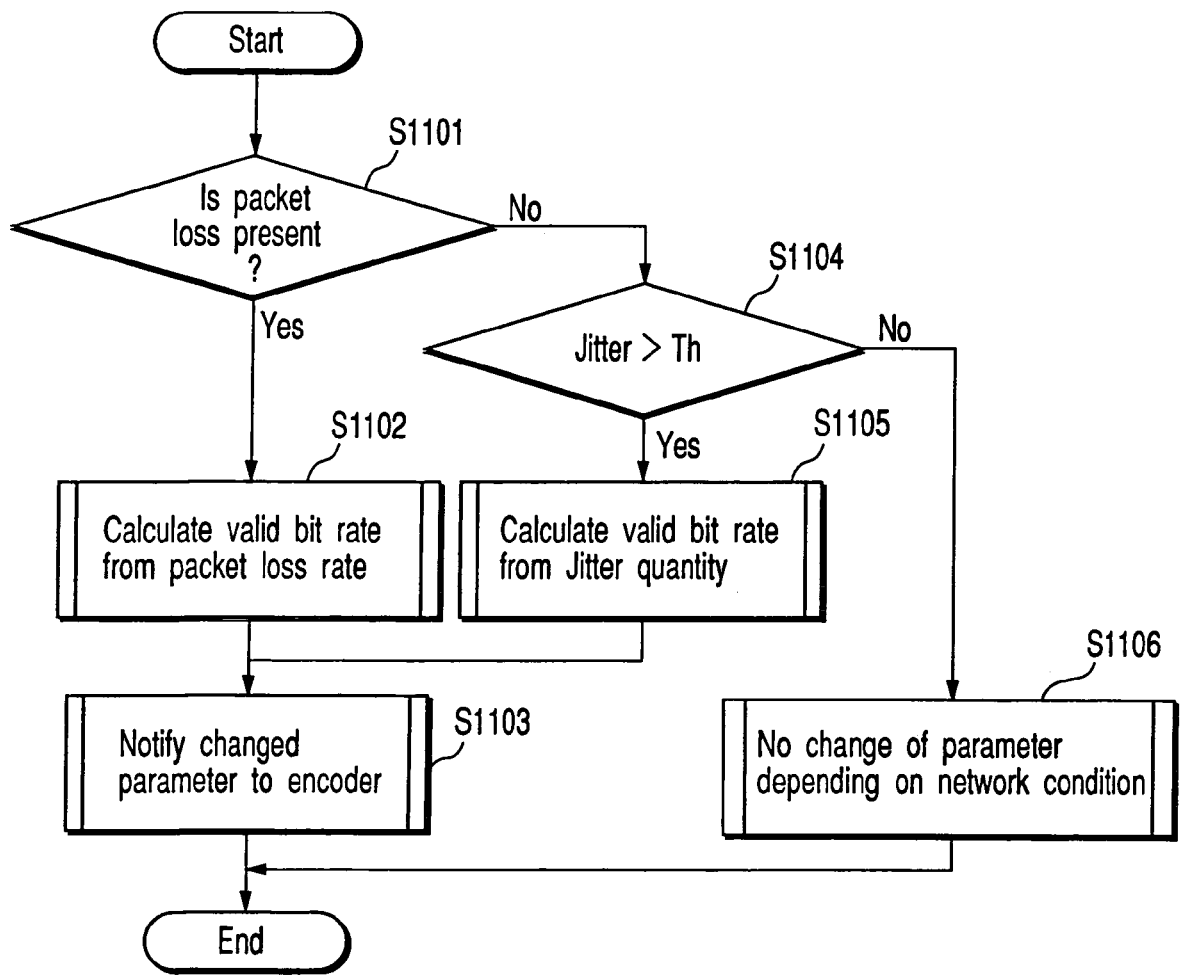
FIG. 11 is a flow chart showing a basic example when a delay is forced to occur by using the network condition determination method at the network condition determination device in the first embodiment of the present invention.

The first embodiment can be carried out by modifying it as follows. For example, as shown in FIG. 11, a method other than that shown in FIG. 10 is employed as a method for determining a network condition at the network condition determination device 105. That is, in the flow chart shown in FIG. 10, a parameter is set at only a packet loss rate. In contrast, in the method shown in FIG. 11, even when no packet loss occurs at the step S1104, a delay quantity is checked. As a result of this check, if a delay occurs in excess of a predetermined value, it is determined that a network is congested. When it is determined that a network is congested, a bit rate is calculated, and a new parameter is set by using formula (2) below, for example, at the step S1105.

$$b' = b \times \{(TN-TS) + (d-d\text{th})\}/(TN-TS) \quad (2)$$

where "b" denotes a delay time, b' denotes a new bit rate, TN denotes a current time, TS denotes a start time, "d" denotes a delay time, and "dth" denotes delay time thresholds.

Figure 2:
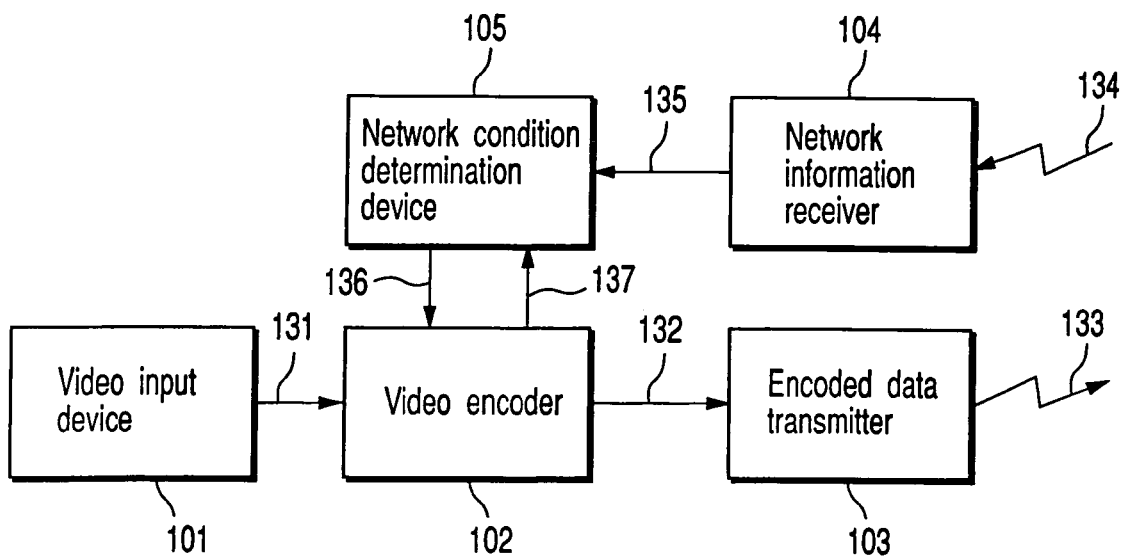
FIG. 2 is a view showing another configuration in the present embodiment.

FIG. 2 shows an example when the network condition determination device 105 is provided with a function for generating the network condition information 136 so as to provide the information to the image encoder 102 by extending the configuration shown in FIG. 1.

According to a configuration shown in FIG. 2, the network condition determination device 105 is provided with a function for acquiring a current parameter at the current image encoder 102 and a function for generating the network condition information 136 on what parameter should be set next from the thus acquired current parameter and network information 135, thereby providing the parameter to the image encoder 102.

In the case of this construction, the network condition determination device 105 can recognize a state of a video parameter, i.e., a state of the encode processing currently done at the video encoder 102, thus making it possible for the network condition determination device to calculate and grasp a bit rate or the like. This construction is advantageous in the case of determining a network condition by comparing the network information 135 with parameter information 137. Thus, a system is realized which is capable of changing a parameter so as to set an optimal bit rate in accordance with the network condition, and providing the parameter to the video encoder 102, thereby adjusting the encode processing.

In this way, according to the present invention, transmission is adjusted in accordance with a transmission state of a transmission channel or error resilience is changed. The transmission state is adjusted by changing a bit rate or changing a frame interval. With respect to a change in quality of a transmission channel, the error resilience is changed according to the transmission state of the transmission channel (for example, the error resilience is changed by changing an interval of an MPEG4 synchronous signal). Therefore, data transmission can be carried out efficiently to the maximum, thereby enabling data transmission that makes it possible to fully utilize transmission requiring real time processing.

Figure 3:
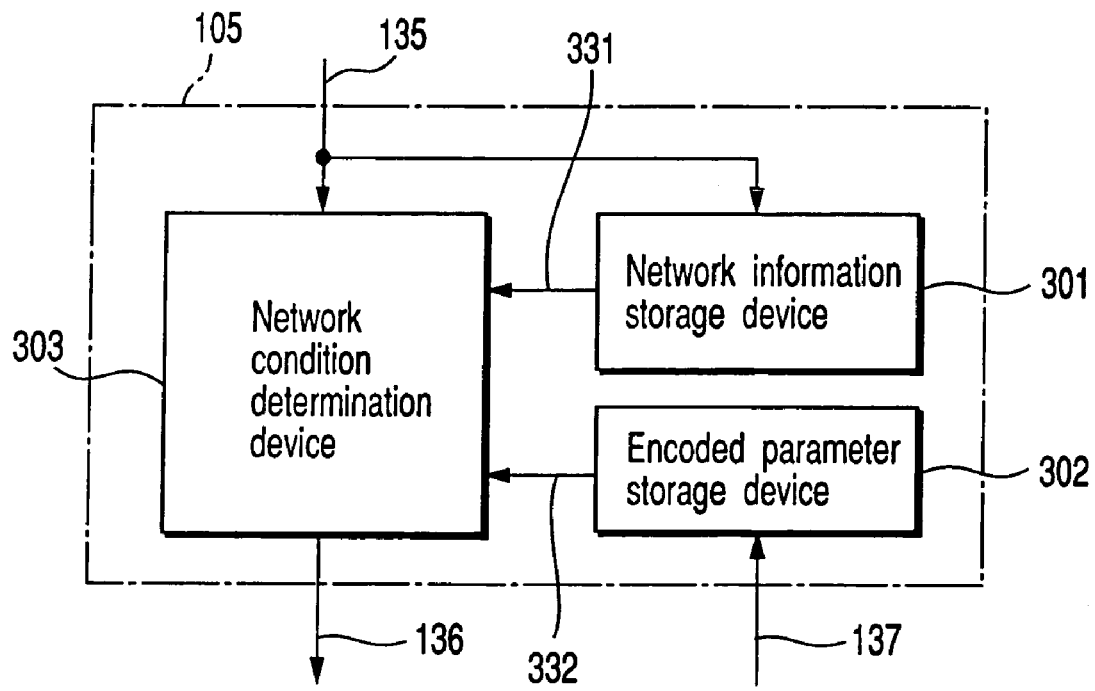
FIG. 3 is a view showing a configuration of a network condition determination device in the present embodiment.

FIG. 3 shows a configuration when the configuration shown in FIG. 2 is further developed. This network condition determination device 105 comprises a network information storage device 301 that stores past network information and an encoded parameter information storage device 302 that stores encoded parameter information supplied to the current video encoder 102. A network condition determination device 303 recognizes the past network information and the current encoded parameter from these elements, decides an elapse of time in network condition from these elements to determine an optimal parameter assigned to the video encoder 102, and provides the parameter to the video encoder 102.

Figure 12:
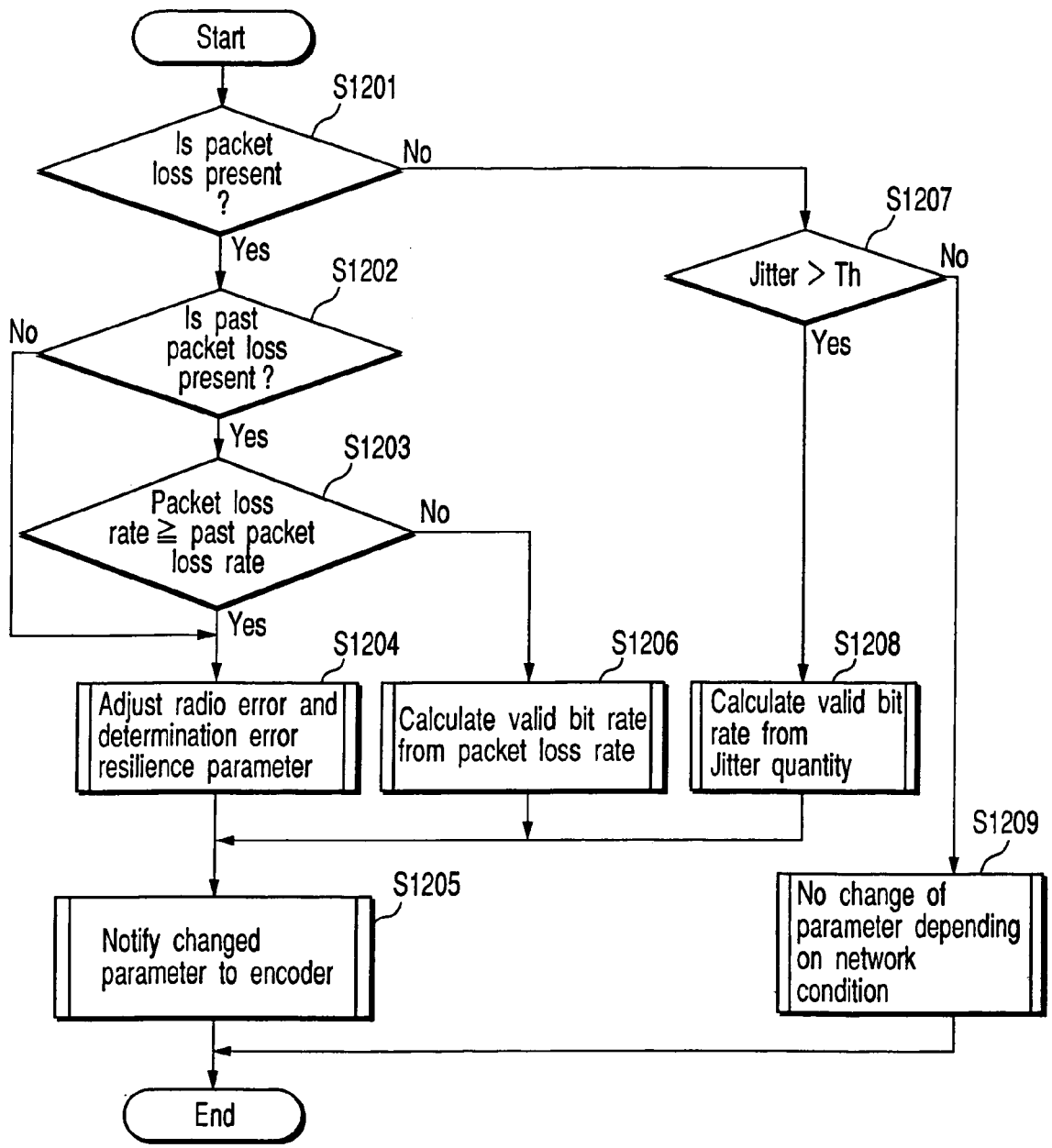
FIG. 12 is a flow chart showing a basic example considering a time direction change with the network condition determination method at the network condition determination device in the present embodiment.

With this construction, it is possible to determine a network condition more accurately by referring to an elapse of time relevant to network information. FIG. 12 shows a flow chart of a network condition determination method in the case of using this system. Processing at the network condition determination device 303 will be described in accordance with this flow chart. First, the network condition determination device 303 determines whether or not packet loss is "0" at the step S1201. As a result of this determination, when the packet loss is present, it is determined by the step S1202 whether or not the past packet loss occurs. As a result, when the past packet loss occurs, the loss rate is compared with the current rate. If the current packet loss rate is higher than the past packet loss rate, it can be determined that the past correction has been invalid.

It is understood from this determination that the bandwidth overflow of transmission data such as network congestion is not troublesome, but a possibility that a noise or the like occurs over a channel resulting in destroying is high. Therefore, the network condition determination device 303 does not change a bit rate at the step S1204, and carries out parameter setting to ensure reliable error correction, and notifies the fact to the video encoder 102 at the step S1205.

If the current packet loss rate is lower than the past packet loss rate at the step S1203, the network condition determination device 303 determines that the past change works efficiently, and re-calculates a valid bit rate from the packet loss rate at the step S1206. When the past packet loss does not occur at the step S1202, the last loss is determined as a channel noise, and processing goes to the step S1204.

On the other hand, when no packet loss occurs at the step S1201, the network condition determination device 303 checks a delay quantity at the step S1207. As a result, when the delay quantity exceeds thresholds "Th", a valid bit rate is calculated from the delay quantity at the step S1208, and the calculation result is notified to the video encoder 102 at the step S1205.

Lastly, when the delay quantity does not exceeds the thresholds "Th", the network condition determination device 303 determines that successful communication is established, and does not change a parameter at the step S1209.

By causing the network condition determination device 303 to carry out such processing, the network condition determination device 105 can have a function capable of determining whether a packet loss occurs on a transmission channel due to network congestion or whether a noise is generated, and the loss occurs due to the impairment of a channel state such as radio equipment.

This function is provided as a mere example. For example, when the past packet loss does not occur at the step S1202, a control for lowering a bit rate may be made by determining network congestion instead of determination of noise. If the current packet loss rate is improved more remarkably than the past packet loss rate at the step S1203, similar parameter change may be made after checking how the past change has been made. In this way, in this system, a variety of determination systems can be set according to a network.

In the foregoing, although there has been shown an example in which the video encoder 102 carries out encode processing based on encoded parameters determined and assigned at the network condition determination device 105, a configuration for the video encoder 102 to determine a parameter can be provided without being limited to the network condition determination device 105. An example is shown in FIG. 4.

Figure 4:
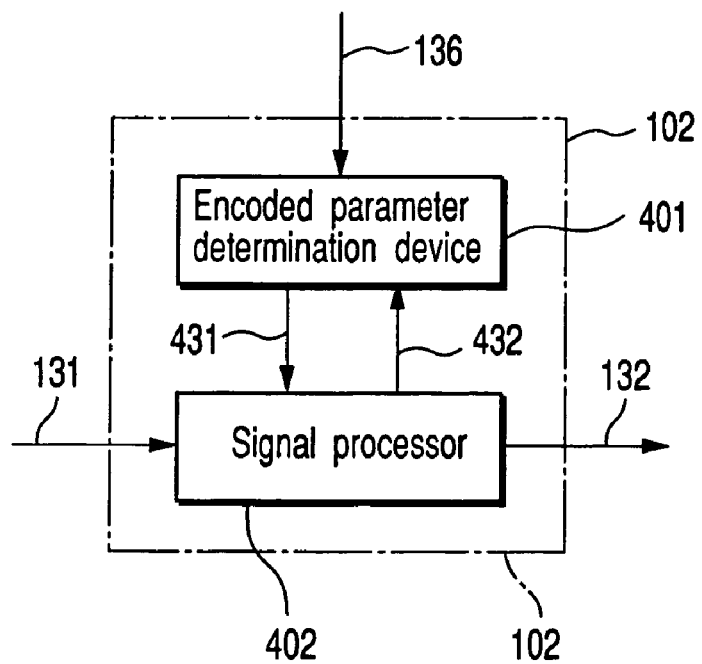
FIG. 4 is a view showing a configuration of a video encoder in the present embodiment.

FIG. 4 is a block diagram depicting an inclusive configuration when the video encoder 102 determines an encoded parameter. In the case of this example, the video encoder 102 comprises an encoded parameter determination device 401 and a signal processor 402.

In the case of this configuration, the network condition determination device 105 is configured to output the network condition information 136 from the network condition determination device 303, and then, provide the information to the video encoder 102.

In such a configuration, the network condition determination device 105 provides the network condition information 136 delivered from the network condition determination device 303 to the video encoder 102. Then, the video encoder 102 first inputs the network condition information 136 to an encoded parameter determination device 401. Then, the encoded parameter determination device 401 recognizes a network condition from this network condition information 136, and generates an encoded parameter 431 in the form suitable to the network condition.

The thus generated encoded parameter 431 is inputted to a signal processor 402. Then, this signal processor 402 encodes the video signal 131 inputted from the video input device 101 by using this encoded parameter 431.

Encoding information 432 such as the number of encoded bits after encoding is inputted to the encoded parameter determination device 401, and is used for the next encoded parameter determination. Encoded data 132 encoded at the signal processor 402 is output to the encoded data transmitter 103.

Figure 5:
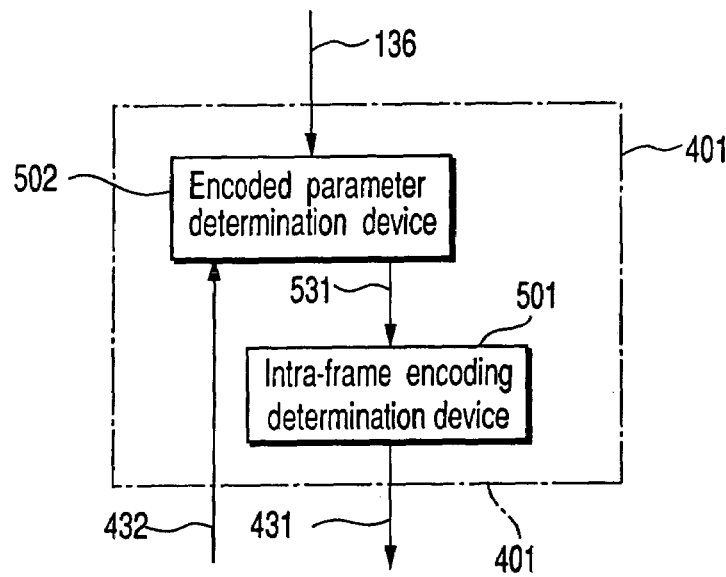
FIG. 5 is a view showing a configuration of an encoded parameter determining device in the present embodiment.

FIG. 5 is a block diagram depicting a configuration including a intra-frame encoding determination device 501 that forcibly sets intra-frame encoding at the encoded parameter determination device 401 shown in FIG. 4. As shown in the figure, the encoded parameter determination device 401 comprises an intra-frame encoding/determination device 501 and an encoded parameter determination device 502.

In the case of this configuration, the network condition information 136 outputted from the network condition determination device 105 is input to the encoded parameter determination device 502 possessed by the encoded parameter determination device 401. Then, encoded parameter information 531 corresponding to the network condition information 136 is output from the encoded parameter determination device 502.

The encoded parameter information 531 is input to the intra-frame encoding determination device 501, and it is determined whether inter-frame encoding is carried out as is or intra-frame encoding is forcibly carried out. When it is determined as intra-frame encoding, the encoding parameter information 531 is updated so as to carry out intra-frame encoding, and is output as the encoded parameter information 431 to the signal processor 402 of the video encoder 102.

By doing this, even if the past data is not transmitted correctly to a receiver, when the data can be received correctly after parameter change, a correct image can be reproduced.

It is possible to configure a video encoder capable of determining a network condition, which has functions of the video encoder 102 and network condition determination device 105, thereby making it possible to provide the previously described function in one block.

The encoded parameter determination device 401 or network condition determination device 105 makes determination concerning the next encoded parameter setting. However, if a picture quality is changed suddenly due to temporary instability of network, an unclear picture may be produced. In order to suppress such a phenomenon, it is possible to incorporate a mechanism in which a change in encoded parameter is suppressed within its predetermined range. In the above described circumstance, this mechanism functions efficiently.

Although a bit rate or an error resilience parameter may be set as its calculated value, it is possible to employ a method of predetermining some patterns, and then, selecting the closest pattern from among them. Further, instead of the closest pattern, it is possible to make a selection of the closest bit rate which is lower than the calculated bit rate. This makes it possible to prevent the generation of a video image with its unexpected image quality due to a combination of a variety of parameters, and makes it possible to prepare a combination of encoded parameters that have been tested to some extent.

In the foregoing example, when the packet loss rate is not "0" or when a delay exceeds the thresholds, there has been made a control such that parameters such as bit rate or error resilience are changed, and the changed is reset to that suitable to the current state.

However, after recovery of a network condition, when no packet loss occurs or when a small delay occurs, it is possible to make a control for increasing a bit rate or decreasing an error resilience parameter.

The foregoing example will be described below according to a second embodiment.

Second Embodiment

Figure 6:
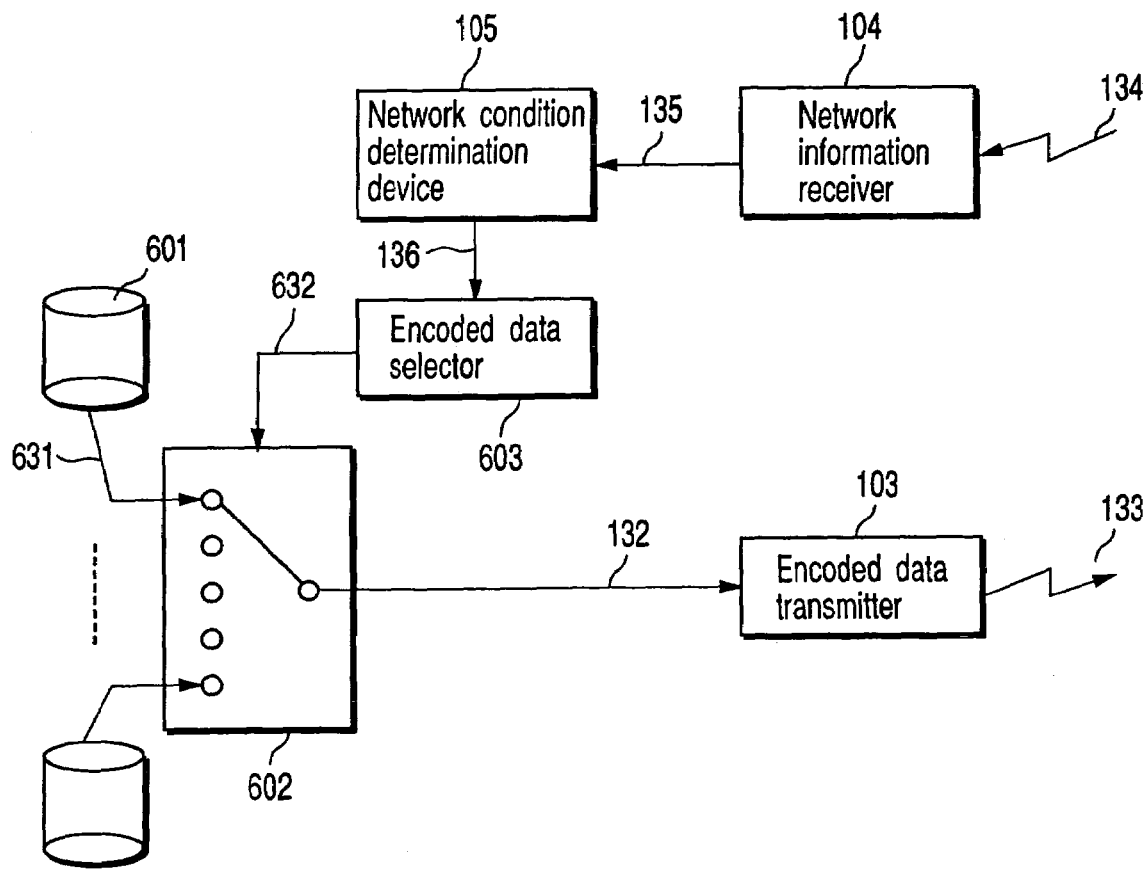
FIG. 6 is a view showing a basic configuration of a data transmission apparatus in a second embodiment of the present invention.

FIG. 6 is a view showing a basic configuration of an image transmission apparatus according to the second embodiment of the present invention. The image transmission apparatus shown in FIG. 6 comprises a plurality of media 601, an encoded data switch device 602, an encoded data selector 603, an encoded data transmitter 103, a network information receiver 104, and a network condition determination device 105.

The storage media 601 are used to store encoded data 631 on contents that have been encoded in advance. The storage media 601 each store encoded data on the same contents encoded by different encoded parameters, respectively.

The encoded data switch device 602 selects one of a plurality of storage media 601, and provides encoding data 631 stored in the thus selected storage medium 601 to the encoded data transmitter 103. A selection of the storage media is carried out in accordance with switch information 632 from the encoded data selector 603.

The network information receiver 104 has a function that receives network information 134 such as packet loss rate or Jitter information delivered from a receiver or a network, and provides the received information as network information 135 to the network condition determination device 105.

The network condition determination device 105 determines a network condition from the input network information 135, and outputs the result as network condition information 136 to the encoded data selector 603. The encoded data selector 603 has a function for estimating, from this network condition information 136, which of the encoded data on encoding parameters is optimal to the current network, and then, outputting to the encoded data switch device 602 the switch information 632 used for switching in order to select encoded data caused by the estimated optimal encoding parameter as an output.

The encoded data switch device 602 selects one item of encoded data from among the input encoded data 631, and outputs encoded data 132.

With such a configuration, the encoded data 631 encoded in advance and store in the storage medium 601 or the like is input to an encoding data switch device 602 when the data is reproduced from the storage medium 601. That is, respective encoded data encoded by the differential encoding parameters are maintained in a plurality of storage media 601. As a result of reproducing these items of data, the encoded data encoded by the different encoding parameters, respectively, is inputted. The encoded data switch device 602 selects one from among these items of data, and outputs it to the encoded data transmitter 103.

This selection is carried out in accordance with switch information 632 from the encoded data selector 603.

On the other hand, network information 134 such as packet loss rate or Jitter information from a receiver is received at the network information receiver 104, and then, the received information is delivered to the network condition determination device 105. The network condition determination device 105 determines a network condition from the inputted network information 135, and outputs the result as network condition information 136 to an encoded data selector 603.

The encoded data selector 603 estimates, from the network condition information 136, which of the encoded data of the encoding parameters is optimal to the current network, and outputs the switch information 632 to the encoded data switch device 602.

The encoded data switch device 602 selects one item of the encoded data from among the input encoded data 631, and outputs encoded data 132.

The present embodiment will be described by way of a specific example.

Now, assume that there exist five storage media 601a to 601e each having stored therein five items of encoded data encoded at 384 kbps, 128 kbps, 64 kbps, 32 kbps, and 16 kbps.

That is, for example, a storage medium having stored therein encoded data on contents encoded at 384 kbps is defined as a storage medium 601a; a storage medium having stored therein encoded data on contents encoded at 128 kbps is defined as a storage medium 601b; a storage medium having stored therein encoded data on contents encoded at 64 kbps is defined as a storage medium 601c; a storage medium having stored therein encoded data on contents encoded at 32 kbps is defined as a storage medium 601d; and a storage medium having stored therein encoded data on contents encoded at 16 kbps is defined as a storage medium 601e.

In the case of using a transmission channel having its quality capable of being transmitted at 384 kbps, first, reproduced encoded data is selected by the storage medium 601a that is a storage medium having stored therein encoded data on contents encoded at 384 kbps; transmission is started at 384 kbps, and reception of network information from the receiver starts at the same time.

Although network information is received at a predetermined interval, if a problem occurs with a network based on the received information, a valid bit rate is calculated at a stage at which a packet loss or delay occurs. The encoded data selector 603 selects encoded data on a bit rate close to the calculated bit rate, and the encoded data switch device 602 switches and transmits the selected data.

For example, the calculated bit rate is 140 kbps, a value close to this bit rate is 128 kbps. In this case, the above switch device selects and switches encoded data reproduced from the storage medium 601b having stored therein encoded data on contents encoded at 128 kbps. In addition, if the calculated bit rate is 100 kbps, a value close to a bit rate lower than the calculated bit rate is 64 kbps. In this case, the switch device selects and switches encoded data reproduced from the storage medium 601c having stored therein encoded data on contents encoded at 64 kbps.

In this way, in the present embodiment, contents are prepared after encoded in advance for type of transmission bit rate, and a current optimal transmission rate is obtained based on network information such as packet loss rate or Jitter information from a receiver that is a function possessed by RTP. A storage medium having stored therein encoded data obtained at the bit rate corresponding to this transmission rate is selected by the switch 602, and reproduced encoded data output of the storage medium is transmitted. In this manner, there is no need for a server to carry out encode processing in real time, making it possible to reduce a load on the server. This is very effective in distributing a pre-produced video such as broadcast in particular.

Figure 7:
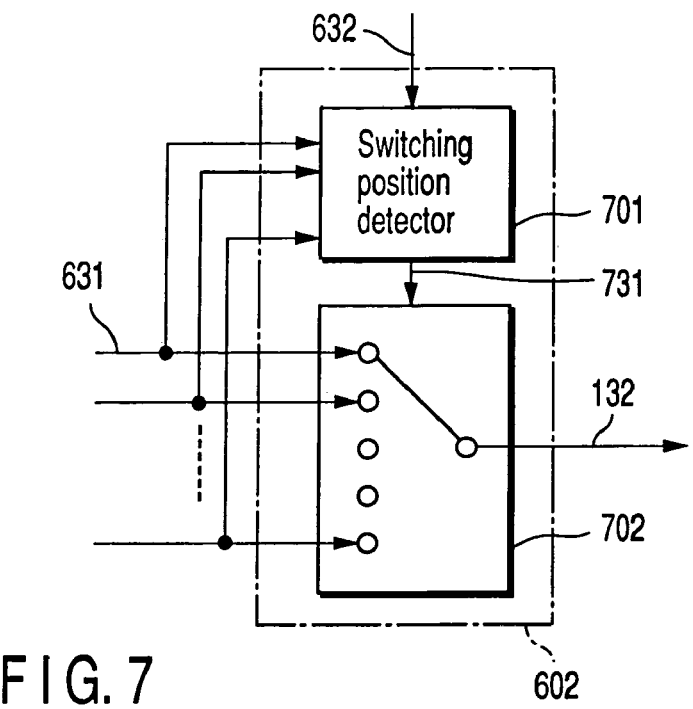
FIG. 7 is a view showing a configuration of an encoded data switch device in the present embodiment.

Now, a modified example of the second embodiment will be described here. FIG. 7 is a block diagram depicting a method for carrying out control for a switch timing of encoded data to be inputted at the encoded data switch device 602.

Encoded data 631 is inputted to the switching position detecting device 701 and a switch device 702. Switch information 632 is inputted to the switching position detecting device 701. If there occurs a need to execute switching from the current encoded data to the other encoded data according to the switch information 632, the switching position detecting device 701 analyzes encoded data, and detects a switching enable position.

This means that a search is made for a frame encoded by intra-frame encoding (I-Picture).

Figure 8:
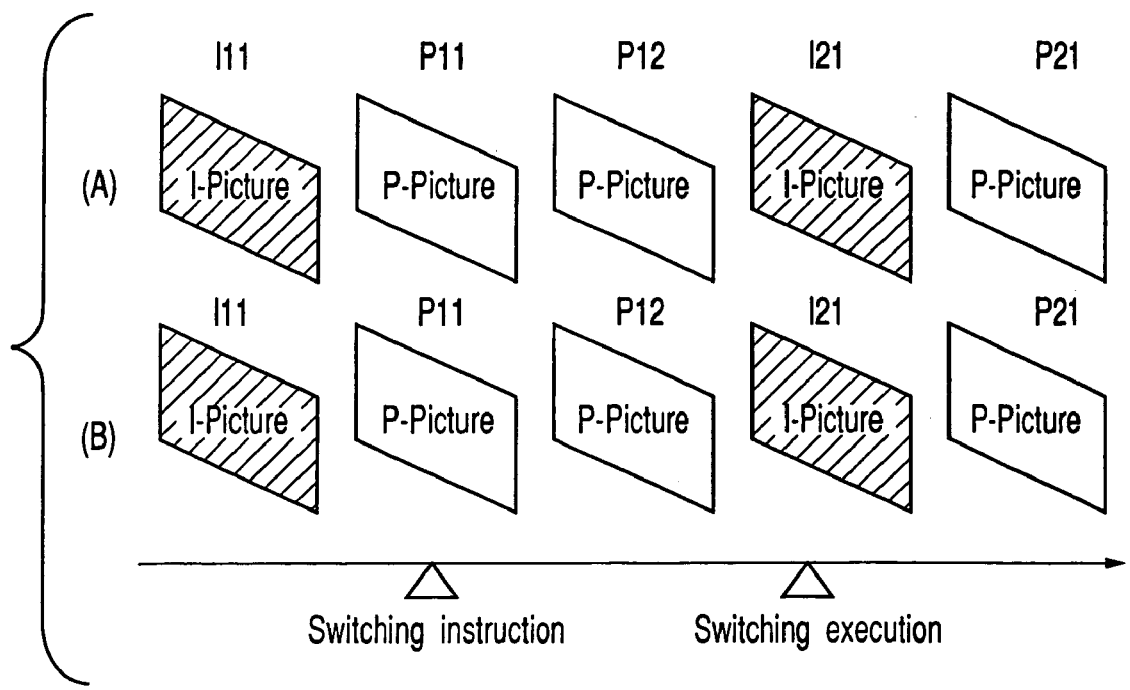
FIG. 8 is a view illustrating a timing of encoded data switching at an encoded data switch device in the present embodiment.

When the switching enable position is set, an instruction for switching encoded data is supplied to the switch device 702 by using the switching instruction information 731. FIG. 8 shows an example of this instruction. Assume that encoded data A is currently selected, and there occurs a need to execute switching to encoded data B according to the switch information 632.

At this stage, assume that a frame is processed at the time of "switching instruction" shown in FIG. 8. In such a case, if encoded data is switched, an unmatched image occurs. This is because a difference from the previous image is encoded in intra-frame encoding (P-Picture). Therefore, if encoded data is switched at the time of P-Picture, an attempt is made to reproduce the next picture (picture P11 of encoded data (B)) by using immediately preceding picture (decoded picture I11 of encoding data (A)). This provides a problem that a correct decode picture cannot be obtained, and a picture is destroyed. Thus, there s occurs a need to execute switching at a timing of a. picture of intra-frame encoding (I-Picture) undergoing encoding by that frame only. This timing is defined as a timing at a position marked with "execute switching".

Figure 9:
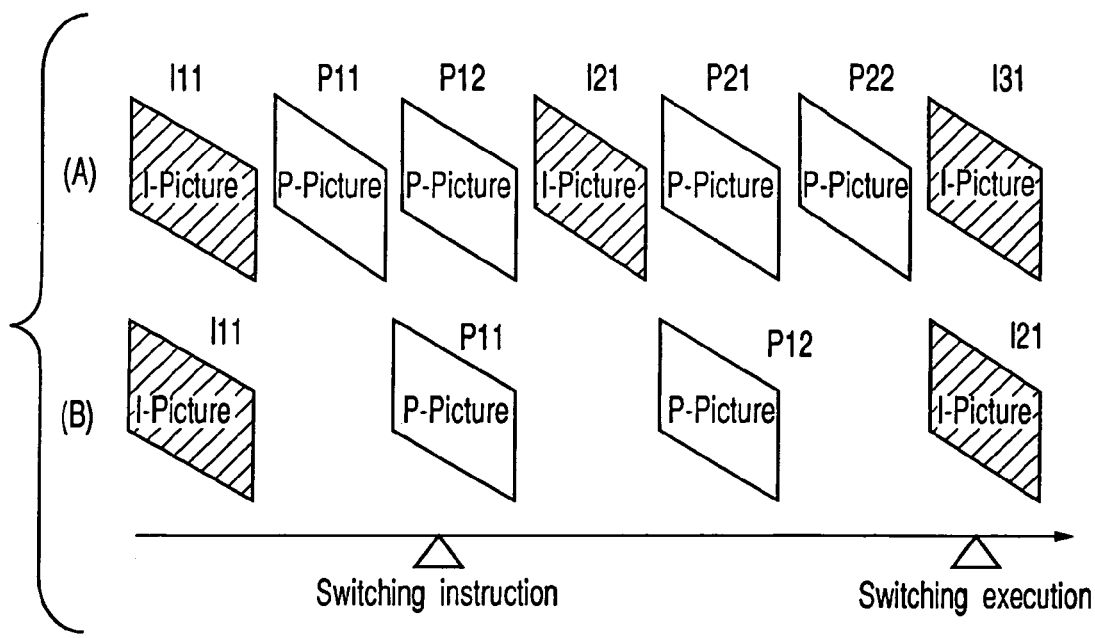
FIG. 9 is a view illustrating a timing of switching encoded data with its different frame interval at the encoded data switch device in the present embodiment.

As in FIG. 9, a case in which the number of frames or time position differs depending on encoded data is considered. In this case as well, a switching enable position of encoded data at a switching destination is detected, and switching of encoded data is executed when the switching enable position is set.

At the switching position detecting device 701 shown in FIG. 7, when a need to execute switching according to the switch information 632 occurs, it is possible to employ a method for temporarily stopping an output 132 to the encoded data transmitter 103, and then, outputting new encoded data to the encoded data transmitter 103 at a stage at which the switching position is set.

This method is effective when it is necessary to suppress a buffer overflow or the like by switching encoded data. When an underflow is problematic, a stuffing bit is forcibly inserted, thereby making it possible to counteract such an underflow.

Third Embodiment

Now, a third embodiment according to the present invention will be described here.

The present embodiment describes an exemplary configuration of an encoding parameter determination device 401 of the video encoder 102 shown in FIG. 4 according to the first embodiment when a time interval (GOP interval) between frames encoded in a intra-frame encoded mode is adjusted based on the network condition information 136 outputted from the network state determination device 105. Here, a description will be given by focusing on differences from the first embodiment.

Figure 13:
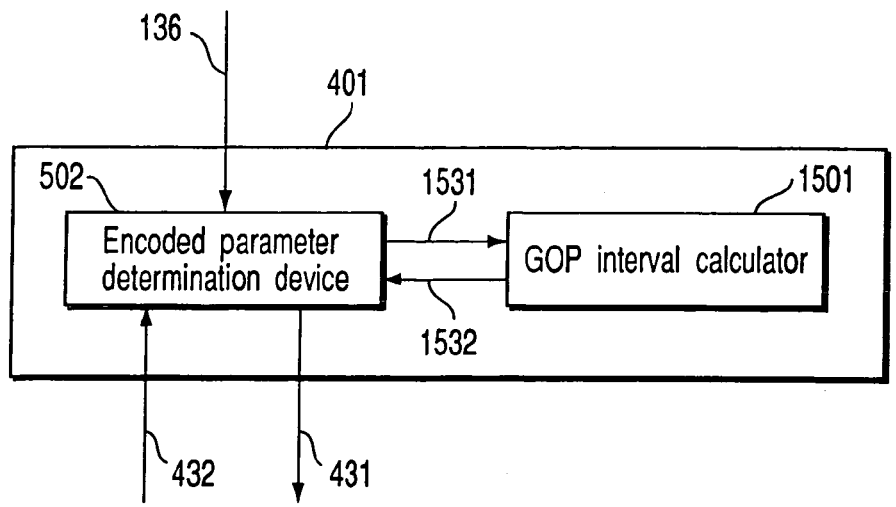
FIG. 13 is a view showing an exemplary configuration according to a third embodiment of the present invention.

FIG. 13 shows an exemplary configuration of the encoding parameter determination device 401. This device comprises a GOP interval calculator (GOP interval calculator) 1501 and an encoding parameter determination device 502.

The network condition information 136 outputted from the network condition determination device 105 (including at least packet loss rate information) is input to an encoding parameter determination device 502. The parameter determination device 502 inputs packet loss rate information 1531 of the network condition information 136 to the GOP interval calculator 1501. The GOP interval calculator 1501 calculates a GOP interval from the packet loss rate information 1531. The GOP interval information 1532 is notified to the encoding parameter determination device 401. The encoding parameter determination device 401 outputs encoding parameter information 431 that contains the inputted GOP interval information 1532. When internally generated parameter information exists, the encoding parameter determination device 401 outputs GOP interval information 1532 and encoding parameter information 431 that contains the internally generated parameter information.

Figure 14:
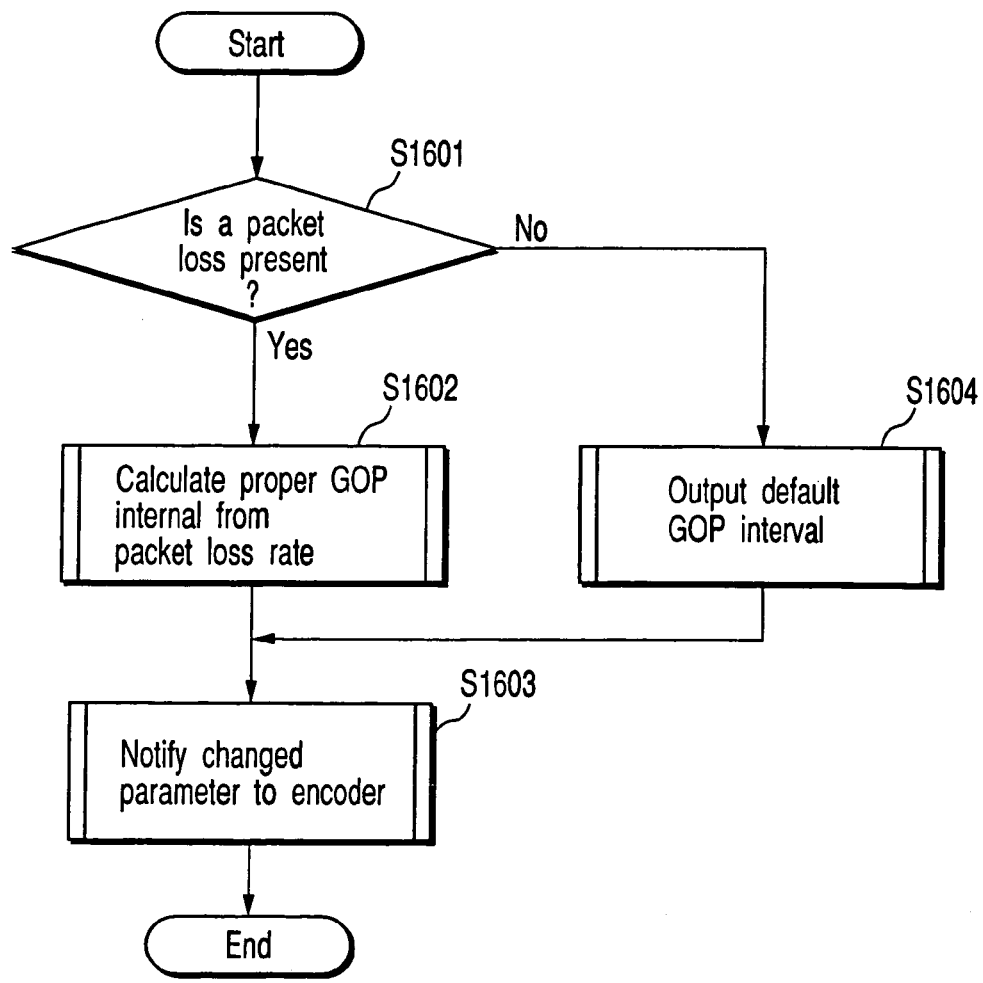
FIG. 14 is a flow chart showing an example of a GOP interval calculation method at a GOP interval calculator in the present embodiment.

FIG. 14 shows an example of a method for determining a GOP interval at the GOP interval calculator.

At the step S1601, it is determined whether or not a packet loss occurs from the network condition information 136. When such a packet loss occurs, the GOP interval is estimated by formula (3) below, for example, at the step S1602.

$$Gop=(TN-TL)/\{(FN-FL) \times r\} \quad (3)$$

where "gop" denotes a GOP interval, "r" denotes a packet loss rate, FN denotes a total number of current frames, FL denotes a total number of frames during past calculation, TN denotes a time, and TL denotes a time during past calculation.

The GOP interval obtained at the step S1602 is notified to the signal processor 402 at the step S1603, and encoding is carried out based on the notified value.

On the other hand, when no packet loss has occurred at the step S1601, the default GOP thresholds are read out at the step S1604. At the step S1603, this value is notified to the signal processor 402.

According to the present embodiment, it is possible to change dynamically the GOP interval to a value suitable to a network. In this manner, when a small number of errors occur, the GOP interval is increased, thereby making it possible to reduce wasteful intra-frame encoded modes in number. In contrast, when a large number of errors occur, the GOP interval is decreased, and a frame in the intra-frame encoded mode appears quickly, thereby making it possible to accelerate recovery. In the present embodiment, it is possible to efficiently select an intra-frame encoded mode.

Figure 15:
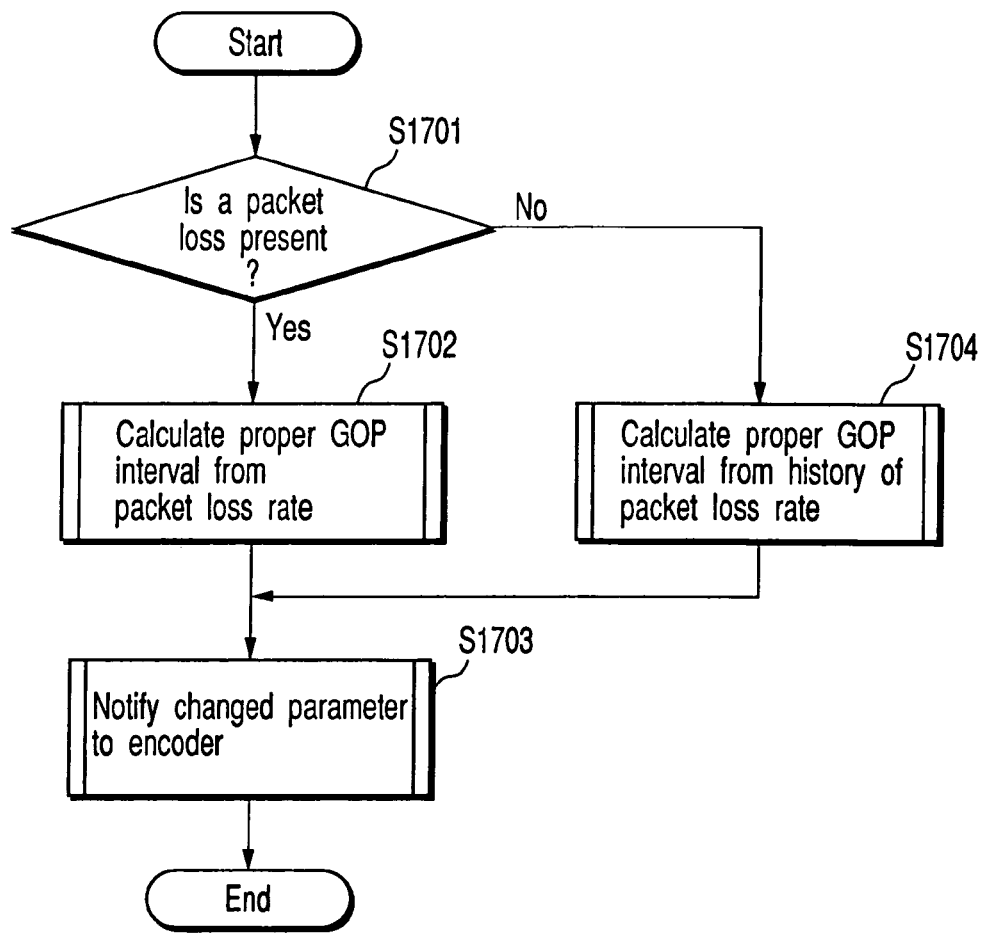
FIG. 15 is a flow chart showing another example of a GOP interval calculation method at a GOP interval calculator in the present embodiment.

FIG. 15 shows another example of a method for determining a GOP interval at the GOP interval calculator in accordance with a flow chart.

In this example, even when packet loss is fewer than that in the system shown in FIG. 14, the network condition is estimated from the past history of packet loss at the step S1704, and an optimal GOP interval is calculated. This technique makes it possible to estimate whether a network is completely free of an error or an error may occurs by checking the past history instead of resetting the GOP interval to the default value by determining that no packet loss occurs at one moment. In this manner, it is possible to determine the network condition more accurately.

Figure 16:
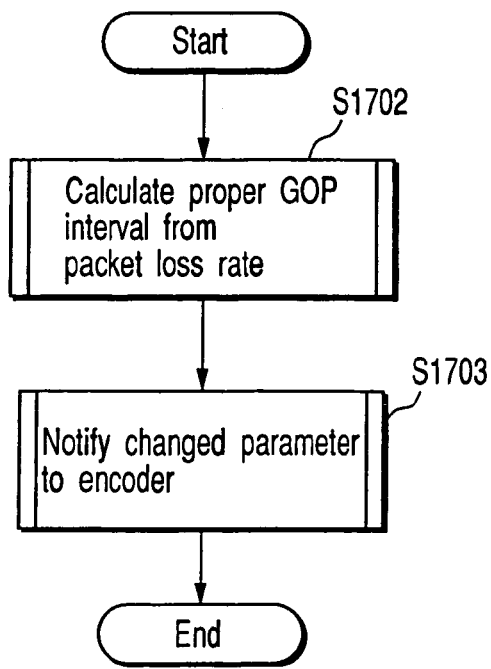
FIG. 16 is a flow chart showing still another example of a GOP interval calculation method at a GOP interval calculator in the present embodiment.

FIG. 16 shows still another example of a method for determining a GOP interval at the GOP internal calculator in accordance with a flow chart.

In this example, the GOP interval is determined by a unique calculation system instead of determination based on the presence/absence of a packet loss. This system can be used to determine the GOP interval from the current packet loss rate in accordance with a single formula or to determine the most suitable GOP interval by checking the past history.

The following formula (4) shows an example of calculation formula for determining the GOP interval.

$$Gop=[(TN-TL)/\{(FN-FL) \times r\}] \times \alpha \quad (4)$$

where "gop" denotes a GOP interval, "r" denotes a packet loss rate, α denotes a sensitivity coefficient, FB denotes a total number of current frames, FL denotes a total number of frames during past calculation, TN denotes a current time, and TL denotes a time during past calculation.

In this example, the GOP interval calculated from an actual value is multiplied by a sensitivity coefficient, thereby making it possible to meet a requirement for accelerating recovery by sacrificing efficiency or a requirement when one does not take care even if an effect of error is somewhat extended. For example, if the sensitivity coefficient α is set to be smaller than 1, a GOP interval which is smaller than that calculated from an actually measured value is output. In this manner, although the efficiency is sacrificed, when an error occurs, it is possible to estimate faster recovery.

The present embodiment is not limited to formulas (3) and (4). For example, in these formulas, a value is calculated by using an increment during past calculation and subsequent, it is possible to calculate the value by taking a margin such as the n preceding increment. In this manner, it is possible to cope with a gradual change hidden in a change in detailed state or to eliminate a temporal change to some extent. Similarly, algorithms are not limited to those shown in the present embodiment.

The foregoing embodiment has described an exemplary configuration when a time interval (GOP interval) is adjusted, the time interval being between the frames encoded in the intra-frame encoded mode based on the network condition information 136 at the encoding parameter determination device 401 of the video encoder 102 shown in FIG. 4 according to the first embodiment. Alternatively, there can be provided a configuration in which the network condition determination device 105 according to the first embodiment (FIG. 1, 2, or 3) determines a time interval (GOP interval) encoded in the intra-frame encoded mode based on information from the network information or information from the network information receiver 104 and information from the video encoder 102, and provides the encoded time interval to the image encoder 102.

As described in the first embodiment, it is possible to configure a video encoder capable of determining a network condition, the video encoder having functions of the video encoder 102 and network condition determination device 105, thereby providing the previously described functions in one block.

In the foregoing, although a variety of embodiments have been described, in short, the present invention utilizes characteristics of RTP, and comprises a system (RTCP) for notifying network state information such as jitter or packet loss rate from a transmitter or receiver. At the transmitter, a bit rate of transmission data at the transmitter is adjusted according to a transmission state of a transmission channel based on the notification of network state information acquired from the receiver in the transmitter such as jitter or packet loss rate so that control such as change of the error resilience level can be carried out. Therefore, according to the above described present invention, data can be transmitted efficiently to the maximum so as to achieve data transmission that makes it possible to fully utilize transmission requiring real time properties as well.

The techniques described in the embodiments of the present invention can be distributed to be stored as a computer executable program in a recording medium such as a magnetic disk (such as a flexible disk or a hard disk); an optical disk (such as CD-ROM, CD-R, CD-RW, DVD, or MO), and a recording medium such as a semiconductor memory. Further, the above program can be distributed by means of transmission via a network.

According to the present invention, it is possible to determine a network condition, and then, optimally set an encoding parameter. In addition, when a packet loss caused by congestion and a loss of a channel error coexist in a network, it is possible to determine the loss, and then, to set a parameter.

Therefore, according to the present invention, there can be provided a data transmission apparatus and method in which data can be transmitted efficiently to the maximum so as to achieve data transmission that makes it possible to fully utilize transmission requiring real time properties.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transmission apparatus, comprising:
   a network receiver configured to receive network information regarding a condition of a network;
   a network condition determination device configured to determine network condition information based on the network information from the network receiver;
   a video encoder configured to encode a video data signal to generate encoded video data and control a bit rate or an error resilience level of the encoded video data according to the network condition information; and
   a transmitter configured to transmit the encoded video data to the network, wherein the encoder is supplied with an encoding parameter as the network condition information and generates encoded data whose bit rate is adjusted according to the encoding parameter,
   the network condition determination device includes a first storage configured to store encoding parameter information obtained by the encoder, a second storage configured to store the network information input by the network receiver, and a determination device configured to determine the encoding parameter by deciding the network condition information based on network information input by the network receiver, past encoding parameter information from the first storage and past network information from the second storage.

2. An apparatus according to claim 1, wherein the network condition determination device includes a computation device configured to compute a Group of Picture (GOP) interval from the network information input from the network receiver to generate the network condition information including GOP interval information indicating the GOP interval obtained by the computation device, and the video encoder encodes the video data signal according to the GOP interval information included in the network condition information.

3. An apparatus according to claim 2, wherein the network condition determination device determines at least a packet loss rate as the network condition information, and the GOP interval computation device computes the GOP interval based on at least the packet loss rate.

4. A data transmission apparatus, comprising:
   a network receiver configured to receive network information regarding a condition of a network;
   a network condition determination device configured to determine network condition information based on the network information from the network receiver;
   a video encoder configured to encode a video data signal to generate encoded video data and control a bit rate or an error resilience level of the encoded video data according to the network condition information; and
   a transmitter configured to transmit the encoded video data to the network,
   wherein the video encoder includes an encoding parameter determination device configured to determine an encoding parameter from the network information input from the network receiver, the video encoder encoding the video data signal to generate the encoded video data whose bit rate is adjusted in correspondence with the encoding parameter determined by the encoding parameter determination device.

5. An apparatus according to claim 4, which includes an intra-frame encoding determination device configured to determine whether a next frame is to be encoded forcibly in an intra-frame encoding mode, when the encoding parameter determination device determines the encoding parameter using the network condition information.

6. An apparatus according to claim 4, wherein the video encoder includes a Group of Picture (GOP) interval computation device configured to compute a GOP interval based on the network information input from the network receiver and encodes the video data signal according to GOP interval information indicating the GOP interval computed by the GOP interval computation device.

7. A data transmission apparatus, comprising:
   a network receiver configured to receive network information regarding a condition of a network;
   a network condition determination device configured to determine network condition information based on the network information from the network receiver;

a video encoder configured to encode a video data signal to generate encoded video data and control a bit rate or an error resilience level of the encoded video data according to the network condition information; and a transmitter configured to transmit the encoded video data to the network, wherein the network condition determination device includes a computation device configured to compute a Group of Picture (GOP) interval from the network information input from the network receiver to generate the network condition information including GOP interval information indicating the GOP interval obtained by the computation device, and the video encoder encodes the video data signal according to the GOP interval information included in the network condition information.

8. An apparatus according to claim 7, wherein the network condition determination device determines at least a packet loss rate as the network condition information, and the GOP interval computation device computes the GOP interval based on at least the packet loss rate.

9. A data transmission apparatus, comprising:

a network receiver configured to receive network information regarding a condition of a network;

a network condition determination device configured to determine network condition information based on the network information from the network receiver;

a video encoder configured to encode a video data signal to generate encoded video data and control a bit rate or an error resilience level of the encoded video data according to the network condition information; and a transmitter configured to transmit the encoded video data to the network, wherein the video encoder includes a Group of Picture (GOP) interval computation device configured to compute a GOP interval based on the network information input from the network receiver and encodes the video data signal according to GOP interval information indicating the GOP interval computed by the GOP interval computation device.

* * * * *